(12) United States Patent
Hassan et al.

(10) Patent No.: US 9,055,590 B2
(45) Date of Patent: Jun. 9, 2015

(54) TRANSMITTER WARM-UP USING DUMMY FRAME GENERATION

(71) Applicant: QUALCOMM Incorporated, San Diego, CA (US)

(72) Inventors: Ahmed H. Hassan, San Jose, CA (US); Kai Shi, San Jose, CA (US); John Thomson, Sherwood Park (CA); Tao-Fei S. Ng, San Jose, CA (US); Sankara S. Venkateswaran, San Jose, CA (US); James S. Cho, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 13/718,724

(22) Filed: Dec. 18, 2012

(65) Prior Publication Data

US 2014/0169348 A1     Jun. 19, 2014

(51) Int. Cl.
| | |
|---|---|
| H04B 1/44 | (2006.01) |
| H04W 74/08 | (2009.01) |
| H04B 1/04 | (2006.01) |
| H04L 12/751 | (2013.01) |
| H04L 25/02 | (2006.01) |
| H04L 29/08 | (2006.01) |
| H04L 1/00 | (2006.01) |

(52) U.S. Cl.
CPC ......... *H04W 74/0808* (2013.01); *H04B 1/0475* (2013.01); *H04L 45/026* (2013.01); *H04L 25/0218* (2013.01); *H04L 29/08612* (2013.01); *H04L 1/0008* (2013.01)

(58) Field of Classification Search
CPC ....... H04L 5/1423; H04L 25/00; H04L 25/03; H04L 25/49; H04L 69/323; H04L 2025/00; H04L 25/0218; H04L 29/08612
USPC .................................................. 370/282, 252
See application file for complete search history.

(56) References Cited

U.S. PATENT DOCUMENTS

| | | | |
|---|---|---|---|
| 4,516,122 A | 5/1985 | Tomikawa | |
| 6,480,473 B1 * | 11/2002 | Chambers et al. ............ | 370/253 |
| 6,721,368 B1 | 4/2004 | Kaufman et al. | |
| 7,558,537 B2 * | 7/2009 | Trachewsky et al. ......... | 455/104 |
| 7,826,429 B2 | 11/2010 | Ronen et al. | |
| 7,856,068 B1 * | 12/2010 | Tung et al. .................... | 375/267 |

(Continued)

OTHER PUBLICATIONS

Agilent Technologies, "Agilent forward link measurements for 1xEV-DO access networks", (2001), 32 pages.

(Continued)

*Primary Examiner* — Ricky Ngo
*Assistant Examiner* — Dewanda Samuel
(74) *Attorney, Agent, or Firm* — Mahamedi Paradice LLP

(57) ABSTRACT

An electronic device includes a medium access controller (MAC) to generate frames and transmitter circuitry to convert the frames to radio-frequency (RF) analog signals for transmission. The MAC is to initiate frame generation at a time that precedes initiation of RF analog signal transmission by a specified time period. In a first mode, the MAC is to generate a dummy frame during a first portion of the specified time period and to initiate generation of a transmit frame during a subsequent second portion of the specified time period. Also in the first mode, the transmitter circuitry is to convert the dummy frame into a first analog signal, discard the first analog signal, convert the transmit frame into a second analog signal, and transmit the second analog signal.

31 Claims, 8 Drawing Sheets

(56) References Cited

U.S. PATENT DOCUMENTS

| | | |
|---|---|---|
| 2006/0239375 A1* | 10/2006 | Kim et al. .................. 375/267 |
| 2008/0063129 A1 | 3/2008 | Voutilainen |
| 2009/0109991 A1* | 4/2009 | Lurie et al. .................. 370/445 |
| 2009/0257457 A1 | 10/2009 | Diab |
| 2010/0124215 A1 | 5/2010 | Kogawa et al. |
| 2010/0189126 A1* | 7/2010 | Lurie et al. .................. 370/445 |
| 2011/0310869 A1* | 12/2011 | Xhafa et al. .................. 370/338 |
| 2011/0317606 A1 | 12/2011 | Osterling et al. |

OTHER PUBLICATIONS

International Search Report and Written Opinion—PCT/US2012/070692—ISA/EPO—Jul. 3, 2013.

* cited by examiner

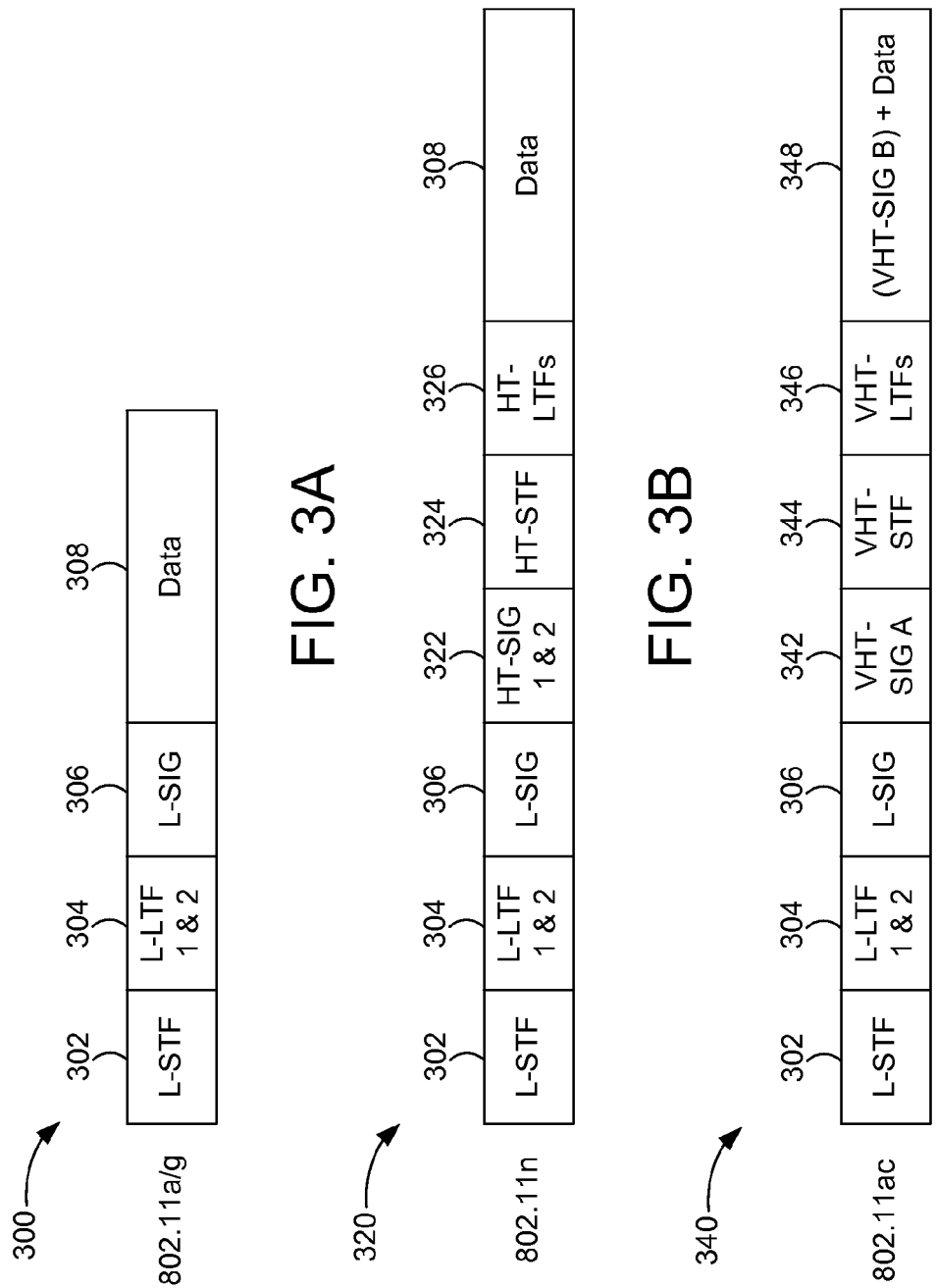

TRANSMITTER WARM-UP USING DUMMY FRAME GENERATION

TECHNICAL FIELD

The present embodiments relate generally to communication systems, and more specifically to noise mitigation when transmitting signals.

BACKGROUND OF RELATED ART

Designing communication devices (e.g., wireless communication devices) to have a low error rate (e.g., a low error-vector magnitude or EVM) presents significant engineering challenges. For example, switching between receive and transmit modes results in transient noise that manifests as an increased EVM. In some instances, this noise affects the frequency of a reference oscillating signal provided by an RF frequency synthesizer, which takes time to settle after switching. As a result, frequency estimation performed using packet header training fields may be inaccurate, such that it differs from frequency estimation performed using entire packets. Inaccurate frequency estimation results in increased EVM.

BRIEF DESCRIPTION OF THE DRAWINGS

The present embodiments are illustrated by way of example and are not intended to be limited by the figures of the accompanying drawings.

FIGS. 3A-3C illustrate examples of frame formats in accordance with different IEEE 802.11 protocols.

Like reference numerals refer to corresponding parts throughout the figures and specification.

DETAILED DESCRIPTION

Embodiments are disclosed in which a warm-up time is provided in a transmitter before generating a transmit frame and corresponding analog signal. A dummy frame and corresponding analog signal may be generated during the warm-up time.

In some embodiments, an electronic device includes a medium access controller (MAC) to generate frames and transmitter circuitry to convert the frames to radio-frequency (RF) analog signals for transmission. The MAC is to initiate frame generation at a time that precedes initiation of RF analog signal transmission by a specified time period. In a first mode, the MAC is to generate a dummy frame during a first portion of the specified time period and to initiate generation of a transmit frame during a subsequent second portion of the specified time period. Also in the first mode, the transmitter circuitry is to convert the dummy frame into a first analog signal, discard the first analog signal, convert the transmit frame into a second analog signal, and transmit the second analog signal.

In some embodiments, a method of signal generation includes successively generating a dummy frame and a transmit frame. The dummy frame is converted into a first analog signal and the first analog signal is discarded. The transmit frame is converted into a second analog signal and the second analog signal is transmitted on a channel.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1:
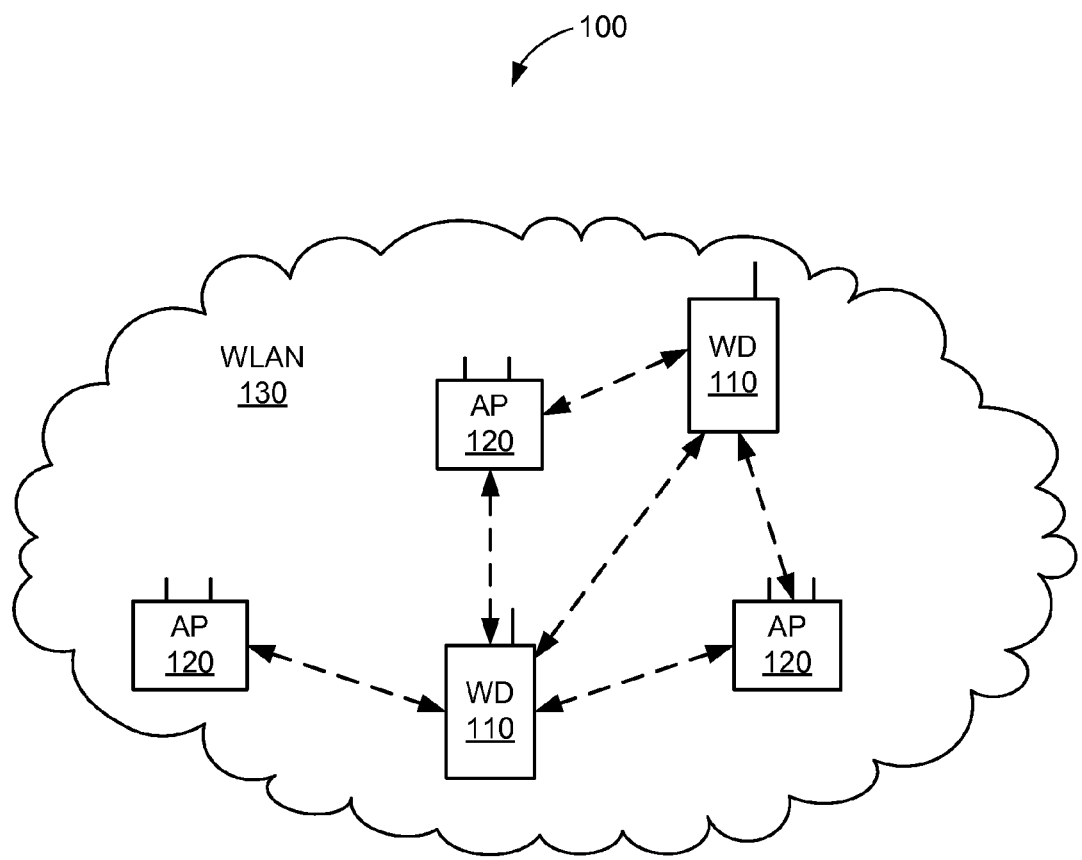
FIG. 1 is a block diagram of a system in which wireless devices and access points compose a wireless local area network in accordance with some embodiments.

FIG. 1 is a block diagram of a system 100 that includes wireless devices (WD) 110 and access points (AP) 120 in accordance with some embodiments. The wireless devices 110 and access points 120 compose a wireless local area network (WLAN) 130. A respective wireless device 110 in the WLAN 130 may communicate wirelessly with one or more access points 130 and/or with other wireless devices 110. In some embodiments, a respective wireless device 110 is a mobile device (e.g., a cell phone, personal digital assistant, tablet computer, laptop computer, or the like). In some embodiments, the WLAN 130 is implemented in accordance with one or more protocols in the IEEE 802.11 family of protocols and thus is a WiFi network. Each of the wireless devices 110 and access points 120 thus may be WiFi-enabled.

Figure 2A:
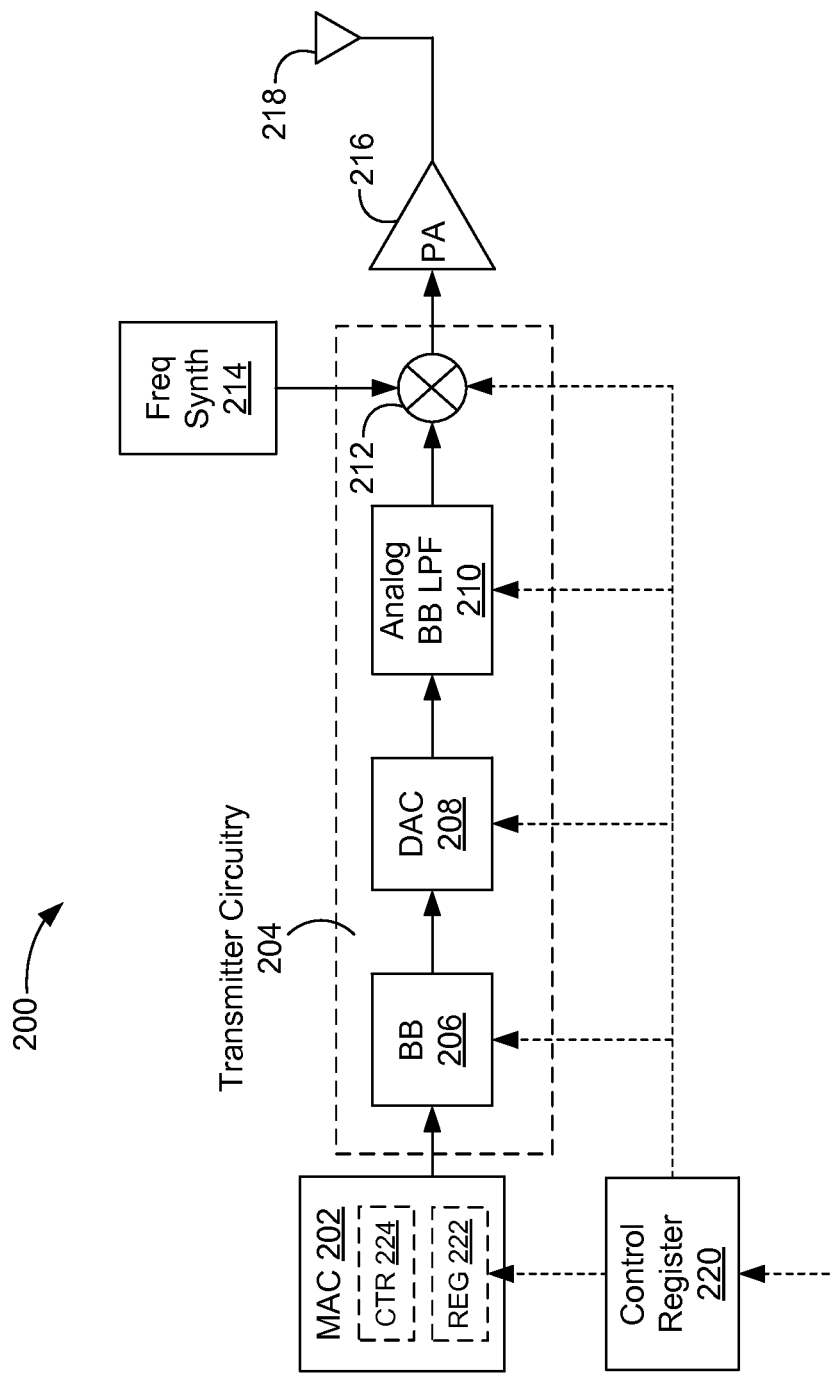
FIG. 2A illustrates circuitry for transmitting data in accordance with some embodiments.

FIG. 2A illustrates circuitry 200 for transmitting data in accordance with some embodiments. The circuitry 200 may be found, for example, in each of the wireless devices 110 and access points 120 of the WLAN 130 (FIG. 1). In the circuitry 200, a media access controller (MAC) 202 generates frames and provides the frames to transmitter circuitry 204, which converts the frames into radio-frequency (RF) analog signals for transmission. The transmitter circuitry 204 includes digital baseband (BB) processing circuitry 206, a digital-to-analog converter (DAC) 208, an analog baseband low-pass filter (BB LPF) 210, and a mixer 212. In some embodiments, the BB processing circuitry 206 includes an encoder to encode data in the frames, a modulator to modulate the encoded data into symbols, and an inverse fast Fourier transform (IFFT) implementation to generate digital samples based on the symbols. The BB processing circuitry 206 provides the digital samples to the DAC 208, which converts the digital samples into baseband analog signals. The analog BB LPF 210 filters the baseband analog signals and provides the filtered baseband analog signals to the mixer 212, which up-converts the filtered baseband analog signals to radio frequency. To perform this up-conversion, a frequency synthesizer 214 generates an RF oscillating signal and provides the RF oscillating signal to the mixer 212, which mixes the filtered baseband analog signals with the RF oscillating signal to produce RF analog signals. The mixer 212 thus functions as an up-converter. An RF power amplifier (PA) 216 amplifies the RF analog signals, which are transmitted through an antenna 218 onto a channel (e.g., a wireless channel).

The circuitry 200 also includes a control register 220 that stores a value that specifies a mode of operation. For example, the control register 220 includes a bit field that stores a value specifying the duration of a delay between the time when the MAC 202 begins frame generation and the time when the PA 216 begins to output a signal. This value is propagated to the MAC 202 and to the transmitter circuitry 204. For example, a control register 222 in the MAC 202 may duplicate the control register 220, as may registers (not shown) in the BB processing circuitry 206, DAC 208, analog BB LPF 210, and/or mixer 212. Storing a first value in the control register 220 (e.g., setting a bit field in the register to '1') programs the circuitry 200 to operate in a first mode (e.g., the mode illustrated below in FIG. 4B, or alternatively FIG. 4C) and storing a second value in the control register (e.g., setting a bit field in the register to '0') programs the circuitry 200 to operate in a second mode (e.g., the mode illustrated below in FIG. 4A).

The MAC 202 may include a counter 224 corresponding to the time period between initiation of frame generation by the MAC 202 and initiation of signal transmission. In some embodiments, the counter 224 is programmable. For example, the value to which it counts may be specified in or determined based on a field of the registers 220 and/or 222.

Figure 2B:
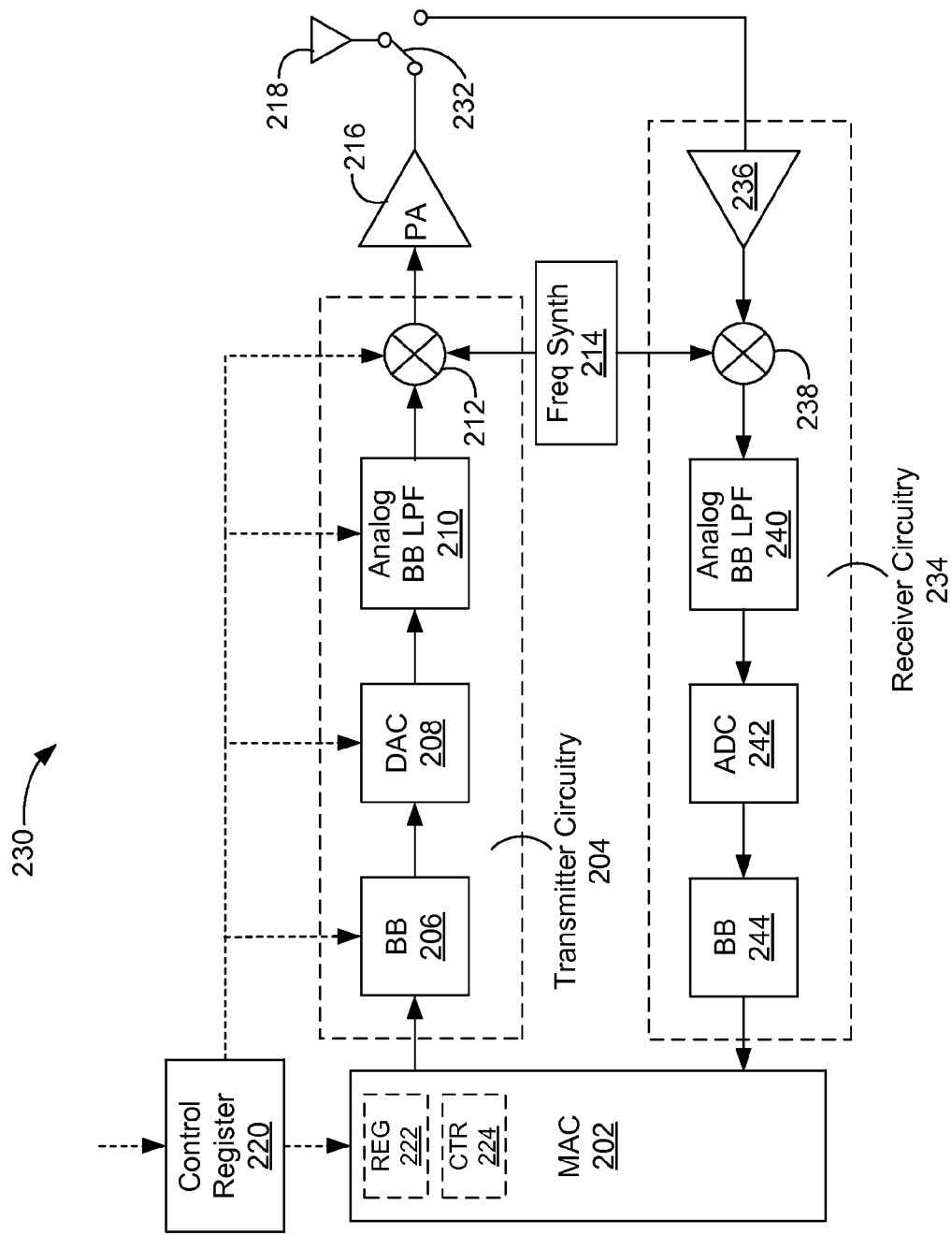
FIG. 2B illustrates transceiver circuitry in accordance with some embodiments.

The wireless devices 110 and access points 120 (FIG. 1) each include receiver circuitry as well as the circuitry 200 for transmitting data. For example, the wireless devices 110 and access points 120 each include transceiver circuitry 230 as shown in FIG. 2B in accordance with some embodiments. The transceiver circuitry 230 includes the MAC 202, transmitter circuitry 204, frequency synthesizer 214, power amplifier 216, and antenna 218 of FIG. 2A. In addition, the transceiver circuitry 230 includes receiver circuitry 234 and a switch 232 to couple either the transmitter circuitry 204 and power amplifier 216, or the receiver circuitry 234, to the antenna 218 at a given time. The switch 232 thus selectively couples the transmitter circuitry 204 and power amplifier 216 to the antenna 218 for signal transmission and selectively couples the receiver circuitry 234 to the antenna 218 for signal reception. The transceiver circuitry 230 thus may perform time-division duplexing (TDD), such that signals are either transmitted or received, but not both, during respective specified time slots.

The receiver circuitry 234 includes an amplifier 236 to amplify RF analog signals received through the antenna 218. The amplifier 236 provides the amplified RF analog signals to a mixer 238, which down-converts the amplified RF analog signals to baseband by mixing them with an RF oscillating signal from the frequency synthesizer 214. The down-converted analog signals are filtered by an analog BB LPF 240 and then converted into digital samples by an analog-to-digital converter (ADC) 242. The ADC 242 is coupled to BB processing circuitry 244, which generates frames based on the digital samples from the ADC 242 and provides the frames to the MAC 202.

Frames that are generated and transmitted (and/or received) using the circuitry 200 (FIG. 2A) or 230 (FIG. 2B) include data fields (e.g., of one or more OFDM symbols) as well as preamble fields. FIGS. 3A-3C illustrate examples of frame formats in accordance with different IEEE 802.11 (i.e., WiFi) protocols. FIG. 3A shows the format of a frame 300 as defined in the IEEE 802.11a/g protocols. The frame 300 has a data field 308 preceded by a preamble that includes legacy short training fields (L-STF) 302, two legacy long training fields (L-LTF 1 & 2) 304, and a legacy signal field (L-SIG) 306. The device receiving the frame 300 uses the L-STF 302 for coarse frequency estimation, as well as for automatic gain control and timing recovery, and uses the L-LTF 1 & 2 304 for fine frequency estimation as well as channel estimation and fine timing recovery. The L-SIG 306 may be used to convey modulation and coding information.

FIG. 3B shows the format of a frame 320 as defined in the IEEE 802.11n protocol. In addition to the fields 302, 304, and 306 (FIG. 3A), the frame 320 includes in its preamble two high-throughput signal fields (HT-SIG 1 & 2) 322, a high-throughput short training field (HT-STF) 324, and four high-throughput long training fields (HT-LTFs) 326. FIG. 3C shows the format of a frame 340 as defined in the IEEE 802.11ac protocol. In addition to the fields 302, 304, and 306 (FIGS. 3A-3B), the frame 340 includes in its preamble a first very high-throughput signal field (VHT-SIG A) 342, a very high-throughput short training field (VHT-STF) 344, and four very high-throughput long training fields (VHT-LTFs) 346. Also, the data field 348 may include a second very high-throughput signal field (VHT-SIG B) as well as a data payload.

The HT-SIG 1 & 2 322, VHT-SIG A 342, and VHT-SIG B may be used to convey modulation and coding information. The HT-STF 324 and VHT-STF 344 may be used for automatic gain control. The HT-LTFs 326 and VHT-LTFs 346 may be used for multiple-input-multiple-output (MIMO) channel estimation.

Frames with formats such as those shown in FIGS. 3A-3C thus include preamble fields (e.g., L-STF 302 and L-LTF 1 & 2 304) that can be used for frequency estimation: a receiving device performs frequency estimation for a signal received from a transmitting device and compensates accordingly, thereby reducing the error rate (e.g., the EVM) of the receiving device. Use of a preamble field in a frame to perform frequency estimation, assumes, however, that the frequency of a local oscillating signal in the transmitting device (e.g., the frequency of the RF oscillating signal generated by the frequency synthesizer 214, FIGS. 2A-2B) is constant throughout generation and transmission of an analog signal corresponding to the frame. This assumption is not necessarily justified. For example, when an electronic device (e.g., a wireless device 110 or access point 120, FIG. 1) switches from receiving a signal to transmitting a signal, the switching may generate noise that is coupled into the frequency synthesizer 214 (FIGS. 2A-2B). Until this noise settles out and the frequency synthesizer 214 achieves steady state, the frequency of the RF oscillating signal produced by the frequency synthesizer 214 may vary from the desired value. The frequency used to up-convert the portion of a signal corresponding to a particular preamble field (e.g., L-STF 302 or L-LTF 1 & 2 304, FIGS. 3A-3C) thus may very from the frequency used to up-convert the portion of the signal corresponding to the data payload (e.g., corresponding to the data field 308 or 348, FIGS. 3A-3C). Frequency estimation based on the preamble thus may be inaccurate, resulting in an increased EVM.

Figure 4A:
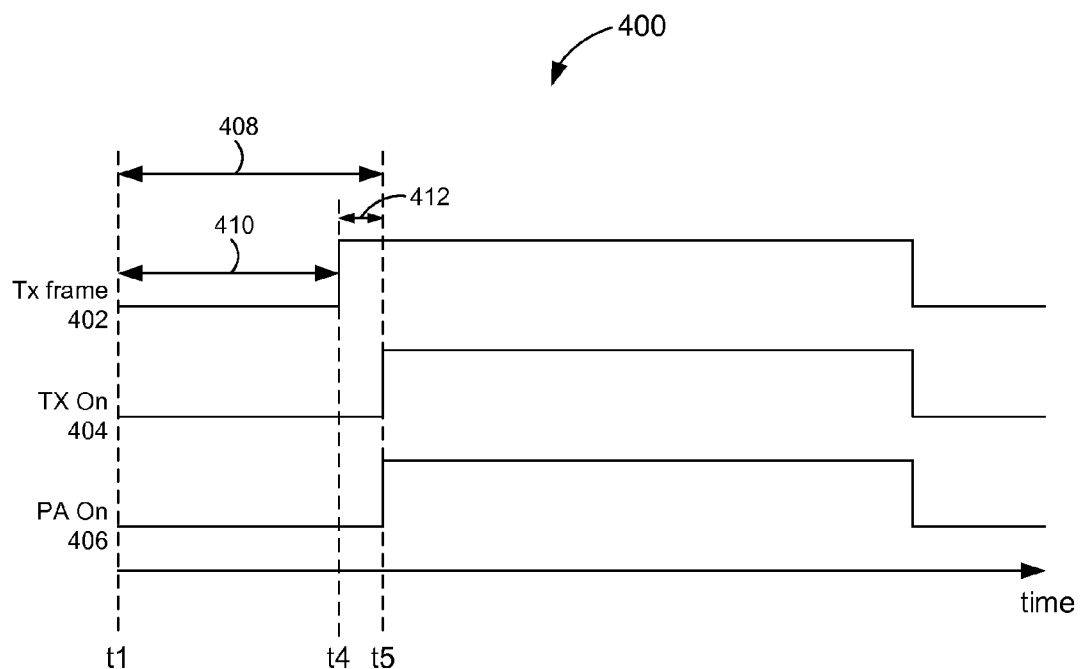
FIGS. 4A-4C are timing diagrams illustrating timing for frame generation and corresponding signal transmission during respective modes of operation in accordance with some embodiments.

FIG. 4A is a timing diagram 400 illustrating timing for operation of the circuitry 200 (FIG. 2A) and/or 230 (FIG. 2B)

during a mode of operation that is susceptible to inaccurate preamble-based frequency estimation. The mode of operation of FIG. 4A may be referred to as a normal mode of operation in accordance with some embodiments. In some embodiments, the circuitry 200 and/or 230 operates in the mode of operation of FIG. 4A when a particular value (e.g., '0') is stored in a specified bit field in the register 220 and/or 222 (FIGS. 2A-2B).

A carrier-sense multiple access (CSMA) time slot 408, which is also referred to as a contention-based time slot 408, extends from a time t1 to a time t5. In one example, the time slot 408 is approximately 9 us in duration. During a first portion 410 of the time slot 408, receiver circuitry (e.g., including the receiver circuitry 234, FIG. 2B) in a device with data to transmit listens to the channel to determine if the channel is idle or if another device is transmitting. The first portion 410 extends from t1 to a time t4 that precedes t5. In one example, the first portion 410 is approximately 7 us in duration. If the channel is idle, such that no transmissions by other devices are detected, the MAC 202 (FIGS. 2A-2B) begins to generate a transmit frame starting at t4, as indicated by assertion of the transmit frame ("Tx frame") control signal 402. In some embodiments, the transmit frame is generated in accordance with an IEEE 802.11 protocol and includes the preamble fields of FIG. 3A, 3B, or 3C. In some embodiments, the MAC 202 sets a bit in the header of the transmit frame to specify the normal mode of operation.

As the MAC 202 generates the transmit frame, it provides the transmit frame to the transmitter circuitry 204 (FIGS. 2A-2B). At t5, the transmitter circuitry 204 (FIGS. 2A-2B), or portions thereof, is enabled, as indicated by assertion of the transmitter-enable (TX On) control signal 404. For example, the DAC 208, analog BB LPF 210, and mixer 212 are activated; the output of the BB processing circuitry 206 may also be activated. The power amplifier 216 is also activated at t5, as indicated by assertion of the PA-enable (PA On) control signal 406. Activation of the power amplifier 216 initiates RF analog signal transmission. Initiation of frame generation by the MAC 202 thus precedes initiation of RF analog signal transmission by a specified time period 412 that extends from t4 to t5. In one example, the specified time period 412 is approximately 2 us in duration. The specified time period 412 time may correspond to the latency between the MAC 202 and power amplifier 216 (FIGS. 2A-2B).

Noise that affects the frequency synthesizer 214, such as noise resulting from activation of various components (including both digital components 206 and 208 and analog components 210 and 212) in the transmitter circuitry 204, may not have settled when RF analog signal transmission begins at t5. As a result, the frequency of the RF oscillating signal provided by the frequency synthesizer 214 may not yet have reached steady state, resulting in errors in the receiving device. To avoid this problem, the predefined period between the beginning of frame generation and the beginning of RF analog signal transmission may be increased.

Figure 4B:
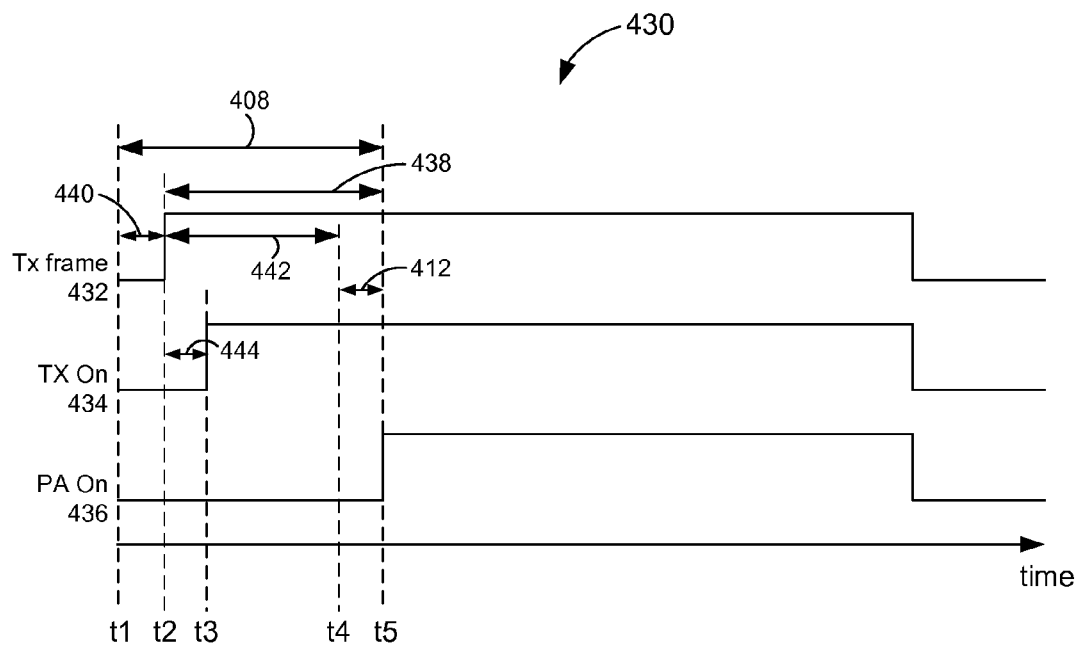

FIG. 4B is a timing diagram 430 illustrating timing for operation of the circuitry 200 (FIG. 2A) and/or 230 (FIG. 2B) during a mode of operation in which the predefined period between the beginning of frame generation and the beginning of RF analog signal transmission has been increased with respect to the timing diagram 400 (FIG. 4A). The mode of operation shown in the timing diagram 430 may be referred to as a transmitter warm-up mode in accordance with some embodiments. In some embodiments, the circuitry 200 and/or 230 operates in the warm-up mode of FIG. 4B when a particular value (e.g., '1') is stored in a specified bit field in the register 220 and/or 222 (FIGS. 2A-2B).

In the timing diagram 430, as in the timing diagram 400 (FIG. 4A), the CSMA time slot 408 extends from times t1 to t5. During of first portion 440 of the time slot 408, receiver circuitry (e.g., including the receiver circuitry 234, FIG. 2B) listens to the channel to determine if the channel is idle or if another device is transmitting. The first portion 440 extends from t1 to a time t2, and is thus shorter than the first portion 410 (FIG. 4A). In some examples, the first portion 440 is in the range of 1-2 us in duration. If the channel is idle, the MAC 202 (FIGS. 2A-2B) begins to generate a dummy frame starting at t2, as indicated by assertion of the transmit frame ("Tx frame") control signal 432. In some embodiments, the dummy frame is generated in accordance with an IEEE 802.11 protocol and include the preamble fields of FIG. 3A, 3B, or 3C or a portion thereof (e.g., including L-STF 302 and L-LTF 1 & 2 304, FIGS. 3A-3C). In some embodiments, the MAC 202 sets a bit in the header of the dummy frame to enable the warm-up mode of operation.

As the MAC 202 generates the dummy frame, it provides the dummy frame to the transmitter circuitry 204 (FIGS. 2A-2B). At a time t3, the transmitter circuitry 204 (FIGS. 2A-2B), or portions thereof, is enabled, as indicated by assertion of the TX On signal 434. For example, the DAC 208, analog BB LPF 210, and mixer 212 are activated; the output of the BB processing circuitry 206 may also be activated. A specified time period 444 (e.g., of approximately 2 us) between t2 and t3 thus separates activation of transmitter circuitry 204 from initiation of frame generation by the MAC 202. Upon activation of the DAC 208 at t3, the transmitter circuitry 204 begins to generate a baseband analog signal corresponding to the dummy frame. This baseband analog signal is filtered by the BB LPF 210 and up-converted to RF by the mixer 212 (FIGS. 2A-2B), resulting in an RF analog signal corresponding to the dummy frame. This RF analog signal is not transmitted, however, because the power amplifier 216 (FIGS. 2A-2B) has not yet been activated, as illustrated by de-assertion of the PA On control signal 436 during the period 438.

At the time t4, the MAC 202 ceases generation of the dummy frame and begins to generate a transmit frame. In some embodiments, the transmit frame is generated in accordance with an IEEE 802.11 protocol and includes the preamble fields of FIG. 3A, 3B, or 3C. In some embodiments, the MAC 202 sets a bit in the header of the transmit frame to enable the warm-up mode of operation. The transmitter circuitry 204 (FIGS. 2A-2B) converts the transmit frame into an RF analog signal. For example, at or about the time t5, the BB processing circuitry 206 (FIGS. 2A-2B) re-starts generation of data samples corresponding to the L-STF 302 (FIGS. 3A-3C). In some embodiments, this L-STF 302 restart is performed in response to enablement of the transmitter warm-up mode by a value stored in the control registers 220 and/or 222 (FIGS. 2A-2B) and/or by the value of a bit in the header of the dummy and/or transmit frames.

Also at t5, the power amplifier 216 is activated, as illustrated by assertion of the PA On control signal 436, and its output is provided to the antenna 218. (If the timing diagram 430 is implemented using the circuitry 230 of FIG. 2B, the switch 232 is closed to couple the power amplifier 216 to the antenna 218 at or before time t5.) The RF analog signal corresponding to the transmit frame thus is transmitted starting at time t5, beginning, for example, with a portion corresponding to the L-STF 302 (FIGS. 3A-3C). Initiation of frame generation by the MAC 202 in the timing diagram 430 therefore precedes initiation of RF analog signal transmission by a specified time period 438 that extends from times t2 to t5. In one example, the specified time period 438 is approximately 7 us in duration.

Because the specified time period 438 in the warm-up mode of FIG. 4B is longer than the specified time period 412 in the normal mode of FIG. 4A, the RF oscillating signal output by the frequency synthesizer 214 has time to settle into a constant frequency before signal transmission begins. Any variation in the frequency of the RF oscillating signal during generation of the RF analog signal corresponding to the dummy frame does not affect transmitted signal quality, because the RF analog signal corresponding to the dummy frame is discarded.

In some embodiments, the specified time period 438 has a programmable duration (e.g., such that the time between initiation of frame generation and the L-STF restart at t5 is programmable). For example, its duration may be programmed by adjusting the duration of a period 442, which extends from times t2 to t4 and thus is part of the specified time period 438. In some embodiments, the duration of the period 442 is determined using the counter 224 (FIGS. 2A-2B). The value to which the counter 224 will count is specified, for example, in a bit field of the control registers 220 and/or 222 (FIGS. 2A-2B). The duration of the period 442 equals this value of the counter 224 divided by the frequency of a system clock (e.g., an 80 or 88 MHz clock), which determines the rate at which the counter 224 counts. The maximum value of the counter 224 is constrained such that the time it specifies is less than the duration of the time slot 408 minus the duration of the period 412. In some embodiments, the counter 224 is implemented and/or controlled in software.

Figure 4C:
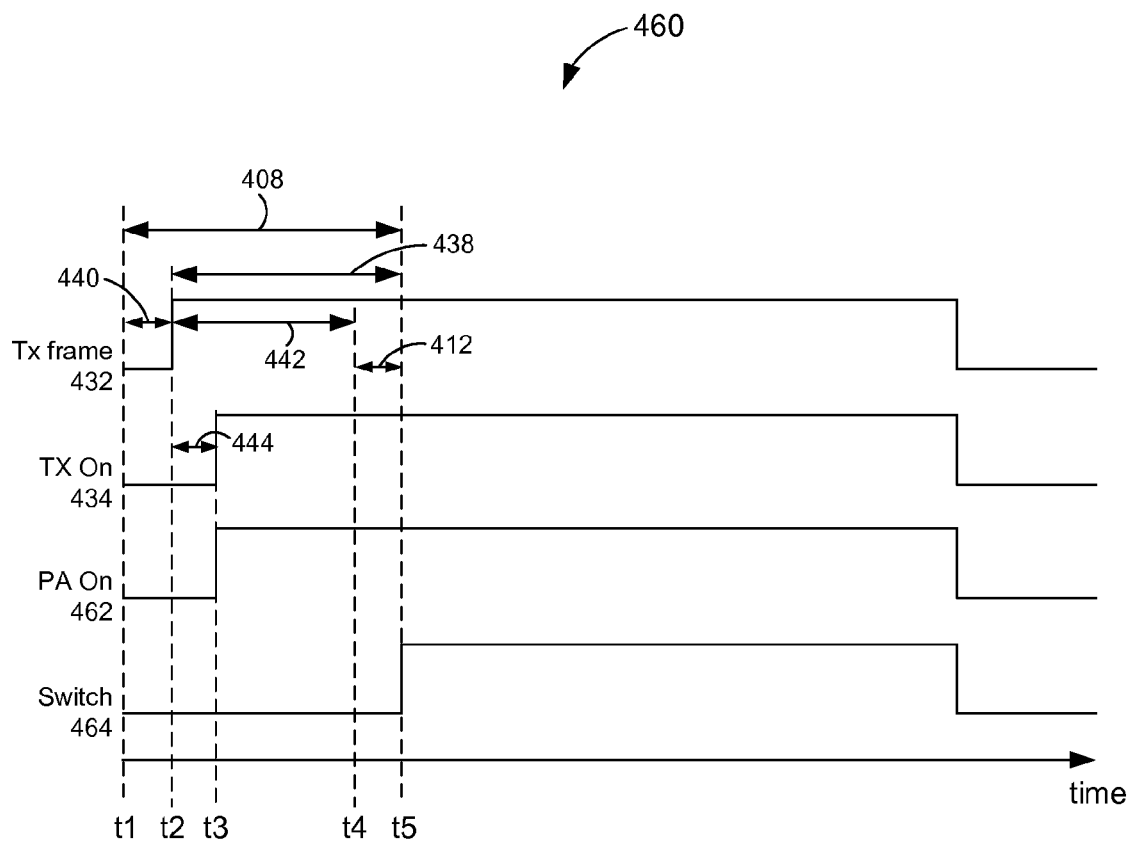

In some embodiments, the analog signal corresponding to the dummy frame is discarded by decoupling the power amplifier 216 from the antenna 218 using the switch 232 (FIG. 2B), instead of (or in addition to) deactivating the power amplifier 216. FIG. 4C is a timing diagram 460 illustrating timing for operation of the circuitry 230 (FIG. 2B) in some such embodiments. The mode of operation shown in the timing diagram 460, like the mode of operation for the timing diagram 430 (FIG. 4B), may be referred to as a transmitter warm-up mode. In some embodiments, the circuitry 230 (FIG. 2B) operates in the mode of operation of FIG. 4C when a particular value (e.g., '1') is stored in a specified bit field in the register 220 and/or 222 (FIG. 2B).

At the time t1 in the timing diagram 460, the switch 232 is open between the power amplifier 216 and the antenna 218, as indicated by de-assertion of the switch control signal 464. The power amplifier 216 is thus decoupled from the antenna 218. For example, the switch 232 couples the antenna 218 to the receiver circuitry 234 (FIG. 2B) at this time. The timing of the operation of the MAC 202 and DAC 208 is the same as in the timing diagram 430 (FIG. 4B), as illustrated by the transmit frame control signal 432 and TX On control signal 434. The power amplifier 216 is activated at the time t3, however (e.g., along with the DAC 208), which is earlier than the time t5 when it is activated in the timing diagram 430 (FIG. 4B). Activation of the power amplifier 216 is illustrated by assertion of the PA On control signal 462. Despite the activation of the power amplifier 216, the RF analog signal corresponding to the dummy frame is not transmitted, because the switch 232 is open.

At the time t4, the MAC 202 ceases generation of the dummy frame and begins to generate a transmit frame. (The dummy frame and transmit frame may both be generated in accordance with an IEEE 802.11 protocol and include the preamble fields of FIG. 3A, 3B, or 3C.) The transmitter circuitry 204 (FIGS. 2A-2B) converts the transmit frame into an RF analog signal. At the time t5, the switch 232 is closed, as illustrated by assertion of the switch control signal 464, thus coupling the power amplifier 216 to the antenna 218. The RF analog signal corresponding to the transmit frame therefore is transmitted starting at t5, beginning, for example, with a portion corresponding to the L-STF 302 (FIGS. 3A-3C). As in the timing diagram 430 (FIG. 4B), initiation of frame generation by the MAC 202 therefore precedes initiation of RF analog signal transmission by the specified time period 438.

In some embodiments, a device selects between the normal mode of FIG. 4A and the warm-up mode of FIG. 4B or 4C in accordance with one or more predefined criteria. For example, mode selection is based on the available timing for a particular transmission. The warm-up mode is selected if it will not result in a collision; otherwise the normal mode is selected. The time between the scheduled transmission of a packet and the reception of a previous packet is compared to the sum of a programmable warm-up time and baseband transmitter latency. If $T_1$ is the scheduled packet transmission time (e.g., t5 at the end of the time slot 408, FIGS. 4A-4C), $T_2$ is the arrival time of the previous packet (e.g., t1, if the arrival immediately precedes the time slot 408, FIGS. 4A-4C), $T_{warm-up}$ is the programmable warm-up time (e.g., the period 442, FIGS. 4B-4C), and $T_{BB-TX}$ is the baseband transmitter latency (e.g., the period 412, FIGS. 4A-4C), then the warm-up mode is selected if:

$$T_1 - T_2 > T_{warm-up} + T_{BB-TX} \quad (1)$$

Satisfaction of equation (1) ensures that the warm-up mode will not result in packet collision.

In some embodiments, mode selection is based at least in part on the type of transmission, and may further be based on whether the criterion of equation (1) is satisfied. Several examples with respect to IEEE 802.11 protocols are now described. If the transmission is of non-burst data without use of a Request to Send/Clear to Send (RTS/CTS) mechanism, then a warm-up mode (e.g., as shown in FIG. 4B or 4C) is used. If the transmission is in a short inter-frame spacing (SIFS) burst with no acknowledgment (no-ACK), then a warm-up mode is used. In these two examples, a receive frame is not immediately followed by a transmit frame; therefore, a warm-up mode may be used without risk of collision. If the transmission uses an RTS/CTS mechanism, then the mode is selected based on an analysis of available timing (e.g., using Equation (1)). Similarly, if the transmission is in a SIFS burst with acknowledgment (with ACK), the mode is selected based on an analysis of available timing (e.g., using Equation (1)). If the transmission is in a reduced inter-frame spacing (RIFS) burst, however, then the normal mode of operation is selected.

Figure 5:
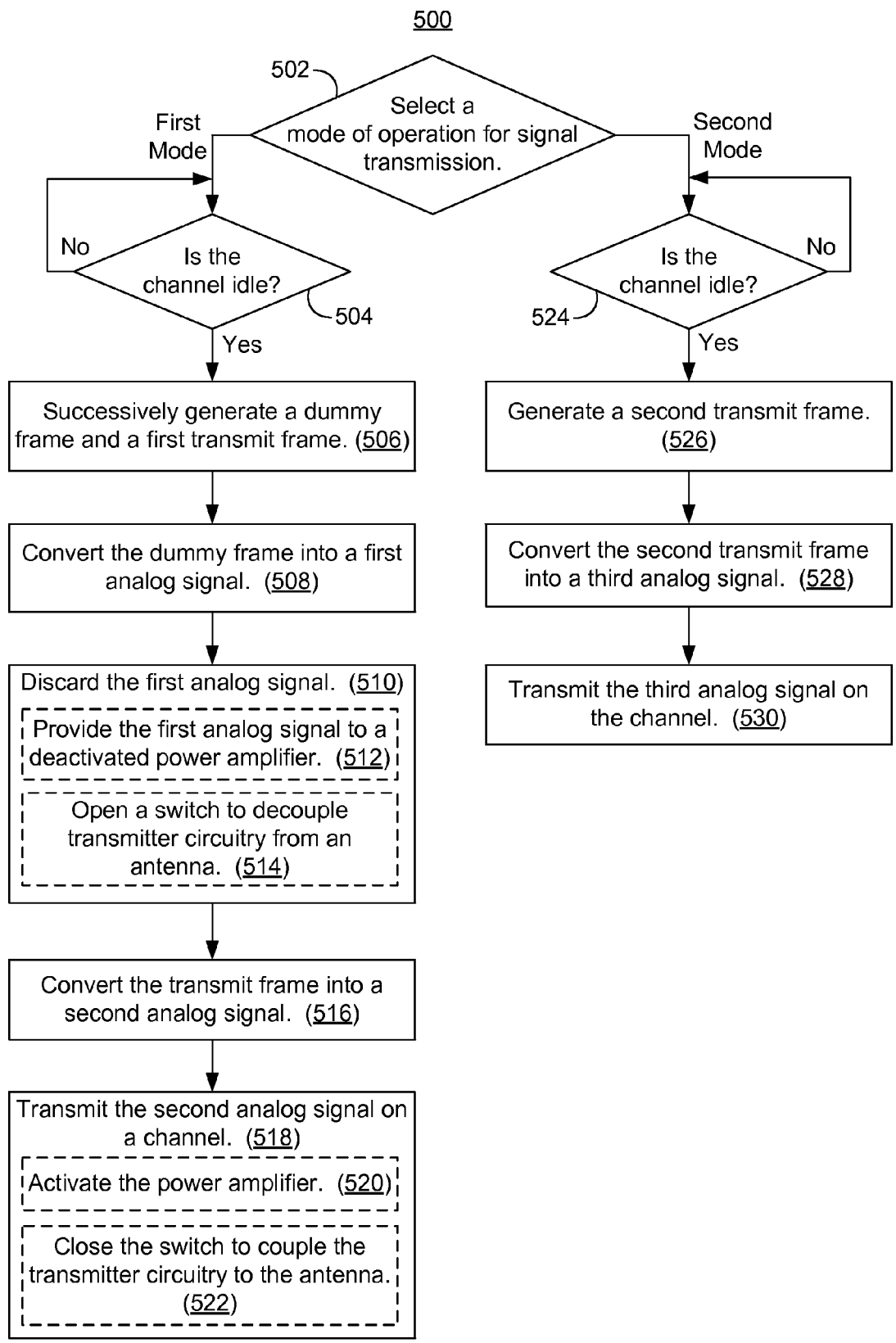
FIG. 5 is a flowchart illustrating a method of performing signal generation and transmission in accordance with some embodiments.

FIG. 5 is a flowchart illustrating a method 500 of performing signal transmission in accordance with some embodiments. The method 500 is performed, for example, using the circuitry 200 and/or 230 (FIGS. 2A-2B) in an electronic device such as a wireless device 110 or access point 120 (FIG. 1).

A mode of operation is selected (502) for signal transmission. The selection is made, for example, between a first mode (e.g., the warm-up mode of FIG. 4B, or alternatively the warm-up mode of FIG. 4C) and a second mode (e.g., the normal mode of FIG. 4A). In some embodiments, the selection is made based on an analysis of available timing (e.g., in accordance with Equation (1)) and/or based on the type of transmission.

If the first mode is selected, the device listens to the channel (e.g., during a period 440 in a CSMA time slot 408, FIGS. 4B-4C) and determines (504) whether the channel is idle. In some embodiments, the listening is performed for a programmable duration. For example, the duration of the period 440 may be increased (or decreased) by decreasing (or increasing) the duration of the period 442 (e.g., by setting a value for the counter 224, FIGS. 2A-2B).

If the channel is not idle (504—No), the operation 504 is repeated (e.g., during a subsequent time slot 408, FIGS. 4B-4C). If the channel is idle (504—Yes), then a dummy frame and a first transmit frame are successively generated (506) (e.g., in accordance with the timing diagram 430, FIG. 4B, or 460, FIG. 4C).

The dummy frame is converted (508) into a first analog signal (e.g., an RF analog signal) and discarded (510). In some embodiments, the converting 508 includes transforming data in the dummy frame into digital samples (e.g., using the BB processing circuitry 206, FIGS. 2A-2B), converting the digital samples into a first baseband analog signal (e.g., using the DAC 208, FIGS. 2A-2B), and up-converting the first baseband analog signal to RF (e.g., using the mixer 212, FIGS. 2A-2B). In some embodiments (e.g., in the example of FIG. 4C), the converting further includes amplifying the up-converted signal (e.g., using the power amplifier 216, FIG. 2B).

In some embodiments, discarding (510) the first analog signal includes providing (512) the first analog signal to the power amplifier 216 (FIGS. 2A-2B) when the power amplifier 216 is deactivated (e.g., in accordance with the timing diagram 430, FIG. 4B). In some embodiments, discarding the first analog signal includes opening (514) the switch 232 (FIG. 2B) to decouple the power amplifier from the antenna 218 (e.g., in accordance with the timing diagram 460, FIG. 4C).

The transmit frame is converted (516) into a second analog signal (e.g., an RF analog signal) and transmitted (518) on a channel (e.g., a wireless channel in the WLAN 130, FIG. 1). In some embodiments, the converting 516 includes transforming data in the transmit frame into digital samples (e.g., using the BB processing circuitry 206, FIGS. 2A-2B), converting the digital samples into a second baseband analog signal (e.g., using the DAC 208, FIGS. 2A-2B), and up-converting the second baseband analog signal to RF (e.g., using the mixer 212, FIGS. 2A-2B). In some embodiments, transmitting the second analog signal includes activating (520) the power amplifier 216 (FIGS. 2A-2B) (e.g., at a time t5, FIG. 4B). In some embodiments, transmitting the second analog signal includes closing (522) the switch 232 (FIG. 2B) to couple the power amplifier 216 to the antenna 218 (e.g., at the time t5, FIG. 4C).

If the second mode is selected in operation 502, the device listens to the channel (e.g., during a period 410 in a CSMA time slot 408, FIG. 4A) and determines (524) whether the channel is idle. In some embodiments, the listening is performed for a programmable duration, which is longer in the second mode than in the first mode. If the channel is not idle (524—No), the operation 524 is repeated (e.g., during a subsequent time slot 408, FIG. 4A).

If the channel is idle (524—Yes), then a second transmit frame is generated (526) (e.g., in accordance with the timing diagram 400, FIG. 4A). The second transmit frame is converted (528) into a third analog signal. The third analog signal is transmitted (530) on the channel. In some embodiments, the converting 528 includes transforming data in the second transmit frame into digital samples (e.g., using the BB processing circuitry 206, FIGS. 2A-2B), converting the digital samples into a third baseband analog signal (e.g., using the DAC 208, FIGS. 2A-2B), and up-converting the third baseband analog signal to RF (e.g., using the mixer 212, FIGS. 2A-2B). In some embodiments, the transmitting 530 includes amplifying the third analog signal using the power amplifier 216 (FIGS. 2A-2B) and providing the amplified signal to the antenna 218 (FIGS. 2A-2B).

The method 500 thus provides a first mode that includes time for the frequency of an RF oscillating signal output by the frequency synthesizer 214 (FIG. 2B) to settle to a steady-state value before signal transmission begins. The ability to select between modes in the method 500, however, allows a second mode to be chosen when the first mode would result in a packet collision.

While the method 500 includes a number of operations that appear to occur in a specific order, it should be apparent that the method 500 can include more or fewer operations, which can be executed serially or in parallel. An order of two or more operations may be changed, performance of two or more operations may overlap, and two or more operations may be combined into a single operation. The method 500 may be repeated, such that the first mode is selected during one iteration and the second mode is selected during another iteration.

Figure 6:
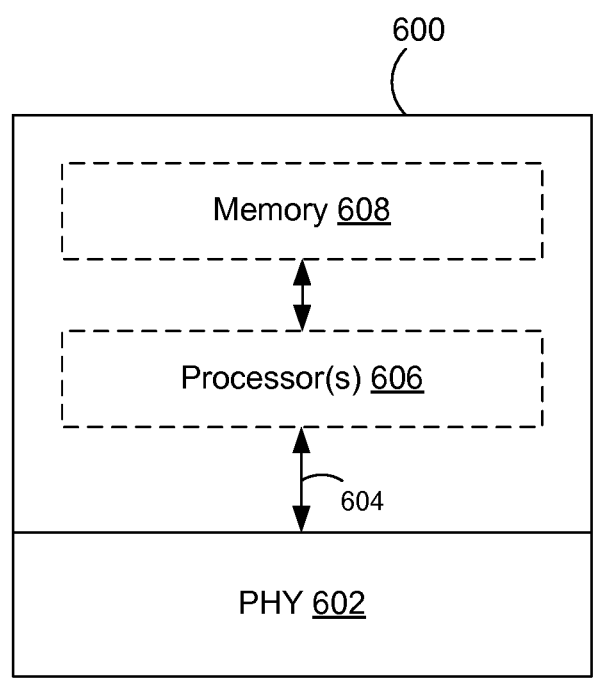
FIG. 6 is a block diagram of an electronic device in which a media access controller is implemented in software in accordance with some embodiments.

In some embodiments, the MAC 202 (FIGS. 2A-2B) is implemented in software, as illustrated in FIG. 6 for an electronic device 600 (e.g., a wireless device 110 or access point 120, FIG. 1). The electronic device 600 includes a physical layer device (PHY) 602 that includes, for example, the transmitter circuitry 204, power amplifier 216, frequency synthesizer 214, and/or receiver circuitry 234 (FIGS. 2A-2B). The PHY 602 is coupled by a media-independent interface 604 to one or more processor cores 606, which are coupled to memory 608. In some embodiments, the memory 608 includes a non-transitory computer-readable medium (e.g., one or more nonvolatile memory elements, such as EPROM, EEPROM, Flash memory, and so on) that stores instructions for execution by the one or more processor cores 606. In some embodiments, the instructions include instructions that, when executed by the processor core(s) 606, cause the controller 600 to implement the functionality of the MAC 202 (FIGS. 2A-2C). In some embodiments, the instructions include instructions that, when executed by the processor core(s) 606, cause the electronic device 600 to perform all or a portion of the method 500 (FIG. 5).

While the memory 608 is shown as being separate from the processor core(s) 606, all or a portion of the memory 608 may be embedded in the processor core(s) 606. In some embodiments, the memory 608 is implemented in the same integrated circuit as the processor core(s) 606 and/or PHY 602.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. An electronic device, comprising:
a medium access controller (MAC) to generate frames; and
transmitter circuitry to convert the frames to radio-frequency (RF) analog signals for transmission;
wherein:
the MAC is to initiate frame generation at a time that precedes initiation of RF analog signal transmission by a specified time period;

in a first mode, the MAC is to generate a dummy frame during a first portion of the specified time period and to initiate generation of a transmit frame during a subsequent second portion of the specified time period; and in the first mode, the transmitter circuitry is to convert the dummy frame into a first analog signal, discard the first analog signal, convert the transmit frame into a second analog signal, and transmit the second analog signal.

2. The electronic device of claim 1, further comprising a power amplifier to amplify the RF analog signals when activated, wherein in the first mode the power amplifier is to be deactivated to discard the first analog signal and is to be activated to amplify the second analog signal.

3. The electronic device of claim 2, wherein the transmitter circuitry comprises a digital-to-analog converter (DAC) to convert digital samples corresponding to the dummy frame and the transmit frame into respective first and second baseband analog signals.

4. The electronic device of claim 3, wherein the transmitter circuitry further comprises:
a baseband processor, coupled between the MAC and the DAC, to convert data in the dummy frame and the transmit frame into the digital samples; and
a mixer, coupled to the DAC, to up-convert the first and second baseband analog signals to RF.

5. The electronic device of claim 4, further comprising a frequency synthesizer, coupled to the mixer, to generate an oscillating RF signal and provide the oscillating RF signal to the mixer;
wherein the mixer is to mix the first and second baseband analog signals with the oscillating RF signal to up-convert the first and second baseband analog signals; and
wherein the specified time period in the first mode corresponds to a settling period for the frequency synthesizer.

6. The electronic device of claim 1, further comprising:
an antenna; and
a switch to selectively couple the transmitter circuitry to the antenna;
wherein in the first mode the switch is to couple the transmitter circuitry to the antenna to transmit the second analog signal and is to decouple the transmitter circuitry from the antenna to discard the first analog signal.

7. The electronic device of claim 6, further comprising a power amplifier to be activated to amplify the first and second analog signals in the first mode.

8. The electronic device of claim 1, wherein:
the transmit frame is a first transmit frame;
the specified time period is a programmable period;
the MAC is configurable such that the programmable period is shorter in a second mode than in the first mode; and
in the second mode, the MAC is to initiate generation of a second transmit frame at the beginning of the programmable period.

9. The electronic device of claim 8, further comprising a power amplifier to be activated at the end of the programmable period in the first and second modes;
wherein the transmitter circuitry comprises a DAC to be activated during the first portion of the specified time period in the first mode and to be activated at the end of the programmable period in the second mode.

10. The electronic device of claim 8, further comprising a control register, coupled to the MAC, comprising a bit field to store a value selecting between the first mode and the second mode.

11. The electronic device of claim 10, wherein the control register further comprises a duration field to store a value specifying a duration of the programmable period.

12. The electronic device of claim 8, further comprising receiver circuitry to listen to a channel and determine whether the channel is idle; wherein:
in the first mode, the MAC is to generate the dummy frame upon the receiver circuitry determining that the channel is idle; and
in the second mode, the MAC is to generate the second transmit frame upon the receiver circuitry determining that the channel is idle.

13. A method of signal transmission, comprising:
in a first mode:
listening to a channel;
determining that the channel is idle;
successively generating a dummy frame and a transmit frame based on a determination that the channel is idle;
converting the dummy frame into a first analog signal;
discarding the first analog signal;
converting the transmit frame into a second analog signal; and
transmitting the second analog signal on the channel.

14. The method of claim 13, wherein the transmit frame is a first transmit frame, the method further comprising:
in a second mode:
listening to the channel;
determining that the channel is idle;
upon determining that the channel is idle, generating a second transmit frame;
converting the second transmit frame into a third analog signal; and
transmitting the third analog signal on the channel.

15. The method of claim 14, wherein:
in the first mode, the listening is performed for a first duration;
in the second mode, the listening is performed for a second duration; and
the second duration is longer than the first duration.

16. The method of claim 14, wherein:
the listening in the first and second modes is performed for a programmable duration; and
the method further comprises setting the programmable duration to be longer in the second mode than in the first mode.

17. The method of claim 13, wherein:
discarding the first analog signal comprises providing the first analog signal to a deactivated power amplifier; and
transmitting the second analog signal comprises activating the power amplifier.

18. The method of claim 17, wherein converting the dummy frame into the first analog signal comprises:
transforming data in the dummy frame into digital samples;
converting the digital samples into a first baseband analog signal; and
up-converting the first baseband analog signal to RF.

19. The method of claim 13, wherein:
transmitter circuitry converts the dummy frame into the first analog signal and the transmit frame into the second analog signal;

an antenna transmits the second analog signal onto the channel;

a switch selectively couples the transmitter circuitry to the antenna;

discarding the first analog signal comprises opening the switch to decouple the transmitter circuitry from the antenna; and transmitting the second analog signal comprises closing the switch to couple the transmitter circuitry to the antenna.

20. The method of claim 19, wherein converting the dummy frame into the first analog signal comprises:

transforming data in the dummy frame into digital samples;

converting the digital samples into a first baseband analog signal;

up-converting the first baseband analog signal to radio frequency; and amplifying the up-converted analog signal.

21. The method of claim 13, wherein:

the method further comprises generating an oscillating RF signal using a frequency synthesizer;

converting the dummy frame into the first analog signal comprises generating a first baseband analog signal and mixing the first baseband analog signal with the oscillating RF signal to up-convert the first baseband analog signal to RF;

converting the transmit frame into the second analog signal comprises generating a second baseband analog signal and mixing the second baseband analog signal with the oscillating RF signal to up-convert the second baseband analog signal to RF; and converting the dummy frame into the first analog signal allows the frequency of the oscillating RF signal to settle before converting the transmit frame into the second analog signal.

22. The method of claim 14, further comprising selecting between the first and second modes based at least in part on a timing analysis.

23. The method of claim 14, further comprising selecting between the first and second modes based at least in part on a type of transmission.

24. A non-transitory computer-readable storage medium having stored therein instructions that, when executed by one or more processors in an electronic device, cause the electronic device to:

listen to a channel in the first mode;
determine that the channel is idle;
successively generate a dummy frame and a transmit frame in a first mode based on a determination that the channel is idle;
convert the dummy frame into a first analog signal;
discard the first analog signal;
convert the transmit frame into a second analog signal; and
transmit the second analog signal on the channel.

25. The computer-readable storage medium of claim 24, wherein:

the transmit frame is a first transmit frame; and
the instructions, when executed by the one or more processors, further cause the electronic device to:
listen to the channel in a second mode and determine whether the channel is idle;
generate a second transmit frame in the second mode upon determining that the channel is idle;
convert the second transmit frame into a third analog signal; and
transmit the third analog signal on the channel.

26. The computer-readable storage medium of claim 24, wherein the instructions, when executed by the one or more processors, cause the electronic device to:

deactivate a power amplifier to discard the first analog signal; and
activate the power amplifier to transmit the second analog signal.

27. The computer-readable storage medium of claim 24, wherein the instructions, when executed by the one or more processors, cause the electronic device to:

open a switch to decouple transmitter circuitry from an antenna, to discard the first analog signal; and
close the switch to couple the transmitter circuitry to the antenna, to transmit the second analog signal.

28. An electronic device, comprising:

means for listening to a channel;
means for determining whether the channel is idle;
means for generating frames, including a dummy frame followed by a first transmit frame, based on a determination that the channel is idle;
means for converting frames into analog signals, including converting the dummy frame into a first analog signal and converting the transmit frame into a second analog signal; and
means for discarding the first analog signal and transmitting the second analog signal on a channel.

29. The electronic device of claim 28, wherein:

the means for generating frames are operable in a first mode and a second mode;
in the first mode, the means for generating frames are to generate the dummy frame followed by the first transmit frame in response to determining that the channel is idle; and
in the second mode, the means for generating frames are to generate a second transmit frame in response to the determination that the channel is idle.

30. The electronic device of claim 28, wherein the means for discarding the first analog signal and transmitting the second analog signal comprise means for selectively amplifying RF analog signals.

31. The electronic device of claim 28, wherein the means for discarding the first analog signal and transmitting the second analog signal comprise means for selectively coupling an antenna to the means for converting frames into analog signals.

* * * * *